(12) United States Patent
Ee

(10) Patent No.: US 11,359,693 B2
(45) Date of Patent: Jun. 14, 2022

(54) PSEUDO FEATURE CONFIGURED AS A DAMPER FOR A DISK-DRIVE SUSPENSION

(71) Applicant: Magnecomp Corporation, Murrieta, CA (US)

(72) Inventor: Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 16/181,681

(22) Filed: Nov. 6, 2018

(65) Prior Publication Data

US 2019/0136940 A1 May 9, 2019

Related U.S. Application Data

(60) Provisional application No. 62/584,007, filed on Nov. 9, 2017.

(51) Int. Cl.
*F16F 15/02* (2006.01)
*B32B 3/26* (2006.01)
*G06F 1/18* (2006.01)

(52) U.S. Cl.
CPC .............. *F16F 15/02* (2013.01); *B32B 3/266* (2013.01); *B32B 2307/56* (2013.01); *F16F 2224/02* (2013.01); *F16F 2224/0283* (2013.01); *F16F 2226/04* (2013.01); *F16F 2230/40* (2013.01); *F16F 2234/06* (2013.01); *G06F 1/187* (2013.01)

(58) Field of Classification Search
CPC .................. F16F 15/02; F16F 2224/02; F16F 2224/0283; F16F 2226/04; F16F 2230/40; F16F 2234/06; G06F 1/187; B32B 3/266; B32B 2307/56; B32B 2224/02
See application file for complete search history.

(56) References Cited

U.S. PATENT DOCUMENTS

| | | | | |
|---|---|---|---|---|
| 3,770,560 | A * | 11/1973 | Elder | B32B 3/266 428/138 |
| 4,626,730 | A * | 12/1986 | Hubbard, Jr. | B06B 1/0688 310/326 |
| 6,116,389 | A * | 9/2000 | Allaei | E04H 9/02 123/192.1 |
| 7,130,157 | B2 | 10/2006 | Sassine et al. | |
| 7,929,254 | B2 * | 4/2011 | Soga | G11B 5/4833 360/266 |
| 8,213,122 | B1 | 7/2012 | Lowry | |
| 8,228,642 | B1 | 7/2012 | Hahn et al. | |
| 8,861,141 | B2 | 10/2014 | Bjorstrom et al. | |
| 9,036,302 | B2 | 5/2015 | Bjorstrom et al. | |
| 2002/0167757 | A1 * | 11/2002 | McCutcheon | B32B 15/20 360/99.08 |
| 2005/0062356 | A1 * | 3/2005 | Hoppe | H02K 41/031 310/183 |
| 2010/0026143 | A1 * | 2/2010 | Pelrine | A61M 5/142 310/366 |

(Continued)

FOREIGN PATENT DOCUMENTS

CN 105882022 A * 8/2016

*Primary Examiner* — Melanie Torres Williams
(74) *Attorney, Agent, or Firm* — DLA Piper LLP (US)

(57) ABSTRACT

A pseudo feature for a suspension and method of manufacture are described. The pseudo feature for a suspension includes a first constraining layer; a second constraining layer; and a damping layer arranged between the first constraining layer and the second constraining layer.

18 Claims, 4 Drawing Sheets

(56) References Cited

U.S. PATENT DOCUMENTS

2013/0045369 A1* 2/2013 Takemura ................. B32B 5/12
 428/188
2015/0162033 A1* 6/2015 Miller .................. G11B 5/4833
 360/244.8
2018/0069172 A1* 3/2018 Fukunaga ................. B32B 3/04

* cited by examiner

PSEUDO FEATURE CONFIGURED AS A DAMPER FOR A DISK-DRIVE SUSPENSION

CROSS-REFERENCE TO RELATED APPLICATIONS

This application claims priority from U.S. Provisional Patent Application No. 62/584,007 filed on Nov. 9, 2017, which is hereby incorporated by reference in its entirety.

FIELD

Embodiments of the invention relate to disk-drive suspensions. In particular, embodiments of the invention relate to dampers for disk-drive suspensions.

BACKGROUND

The need for reliable data storage devices with high storage capacity and low-latency access times results in a disk-drive suspension operating in extreme conditions. To increase the performance of the current state of data storage devices, disk-drive suspension with better operating characteristics in the extreme operating conditions are needed.

SUMMARY

A pseudo feature for a suspension and method of manufacture are described. The pseudo feature for a suspension includes a first constraining layer; a second constraining layer; and a damper layer arranged between the first constraining layer and the second constraining layer.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments relate to a pseudo feature for a disk-drive suspension configured as a damper and methods of manufacturing the pseudo feature configured as a damper. The pseudo feature configured as a damper includes one or more constraining layers and at least one damper layer. The pseudo feature is configured to be mounted or integrated in whole or part with a disk-drive suspension to help tune the suspension for better operation characteristics, such as adding stiffness, minimalizing vibration, or otherwise enhancing the operation characteristics of the suspension. Additionally, the use of the pseudo feature provides the ability to lower the number of piezoelectric motors used on a suspension as compared with a design that includes an extra piezoelectric motor instead of a pseudo feature. The ability to use a lower number of piezoelectric motors decreases the cost and improves the reliability of a suspension.

Figures 1, 2:
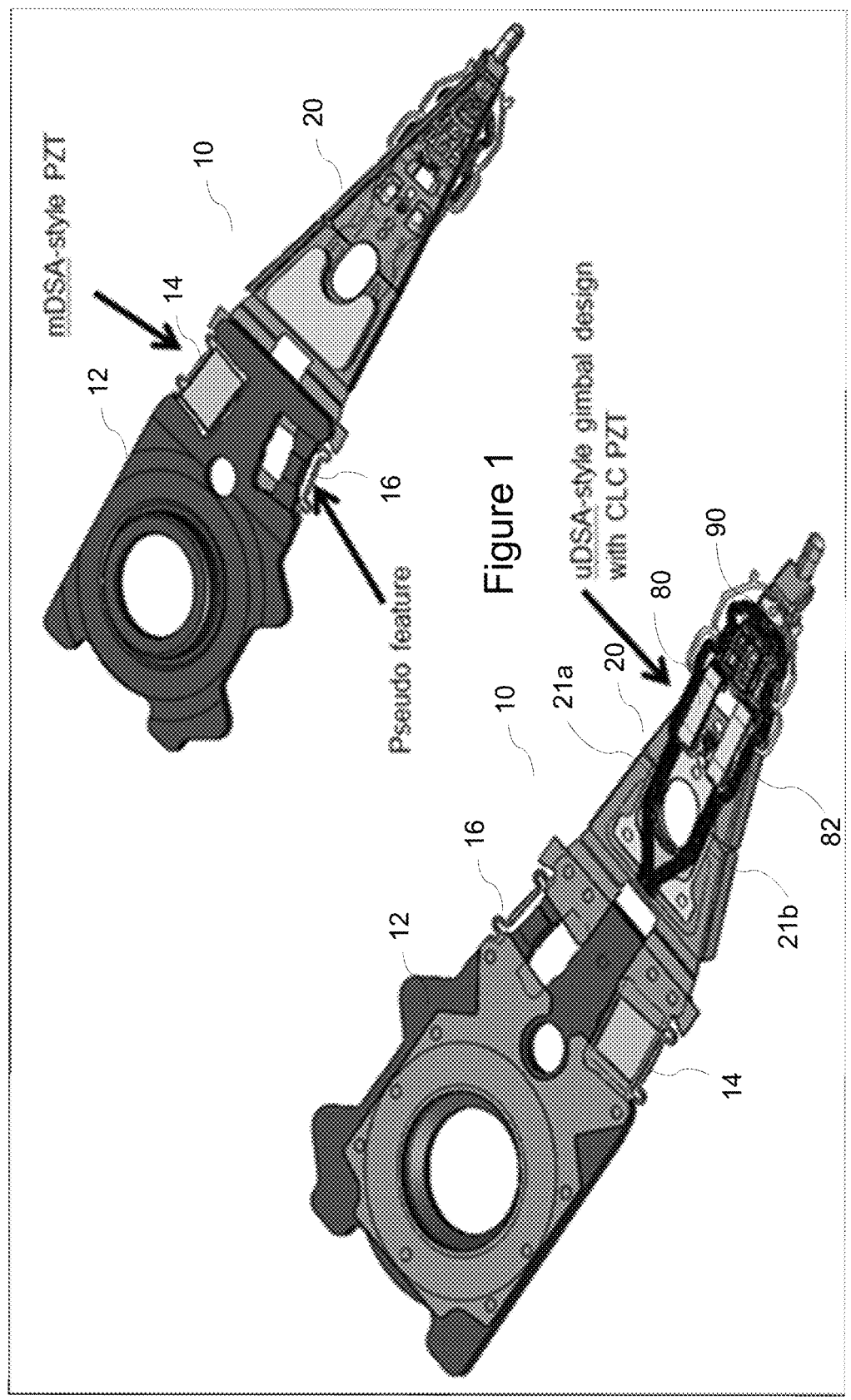
FIG. 1 illustrates a top oblique view of a tri-stage actuated suspension according to an embodiment.
FIG. 2 illustrates a bottom oblique view of the suspension of FIG. 1.

FIG. 1 illustrates a top oblique view of a tri-stage actuated suspension according to an embodiment. The tri-stage actuated suspension 10 includes a single piezoelectric motor 14 at the baseplate 12 and a pseudo feature 16. Expansion and contraction of the piezoelectric motor 14 moves a load beam 20 of suspension 10 using techniques including those known in the art.

FIG. 2 illustrates a bottom oblique view of the suspension of FIG. 1. Two piezoelectric flexure motors 80/82 arranged on opposite lateral sides of the suspension act in push-pull fashion on the gimbal are configured to rotate a head slider 90 using techniques including those known in the art. Head slider 90 contains a magnetic read transducer and a magnetic write transducer in order to respectively read data from, and write data to, the disk drive platter. The pseudo feature 16 fails to provide any damping effect to the suspension. A first grouping of traces 21a and a second grouping of traces 21b are used to carry power and electrical signals to components, such as the motors 80/82 and the head slider 90.

Figure 3:
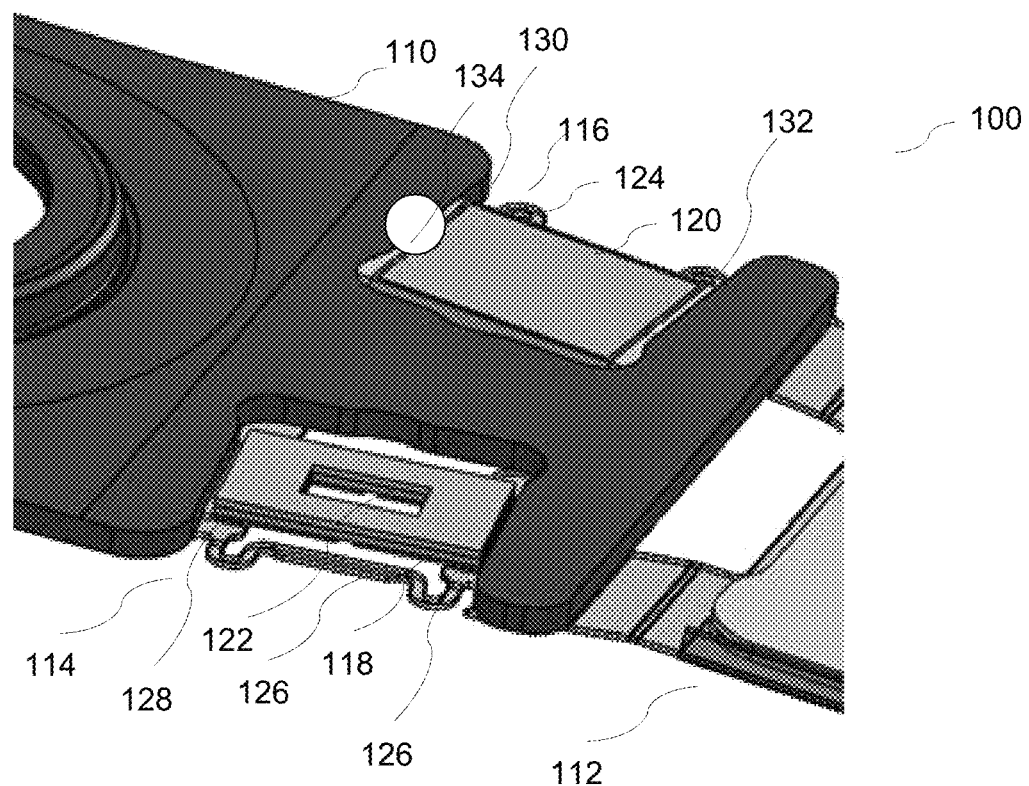
FIG. 3 illustrates a portion of a suspension including a pseudo feature configured as a damper according to an embodiment.

FIG. 3 illustrates a portion of a suspension including a pseudo feature configured as a damper according to an embodiment. The suspension 100 may be a dual-stage actuation suspension, a tri-stage actuation suspension, or other suspension design. The suspension 100 includes a baseplate 110 and a loadbeam 112. The baseplate 110 includes a first opening 114 and a second opening 116. According to various embodiments, the suspension includes a pseudo feature 118 configured as a damper in the first opening 114 and a piezoelectric motor 120 in the second opening 116. The pseudo feature 118 is configured to define a hole 122. The size of the hole 122 is configured based on a stiffness and a mass requirement for the suspension. For example, the size of the hole 122 can be configured to provide a pseudo feature 118 with a bending stiffness that can be lower while having a relatively higher twisting stiffness. Other embodiments of a pseudo feature 118 configured as a damper do not define a hole in one or more of the layers that form the pseudo feature 118.

According to some embodiments, a baseplate 110 of the suspension 100 may include one or more struts 124, 126 configured to bridge the openings 114, 116 in the baseplate 110 to provide stabilization to the suspension 100 when a piezoelectric motor 120 is actuated. The struts 124, 126, according to some embodiments, are affixed to the baseplate 110 using techniques including, but not limited to, welding, adhesive, and other mounting techniques such as those known in the art. According to some embodiments, the struts 124, 126 are formed integrally with the baseplate 110.

The baseplate 110 includes a first pair of mounting pads 126, 128 and a second pair of mounting pads 130, 132. Each pair of mounting pads are configured to receive a piezoelectric motor or a pseudo feature configured as a damper. For various embodiments, a first pair of mounting pads 126, 128 is on an opposite side of a longitudinal axis of the baseplate 110 from the second pair of mounting pads 130, 132. The mounting pads 126, 128, 130, 132, according to some embodiments, are configured to mount a piezoelectric motor 120 and the pseudo feature 118 configured as a damper on the same side of the suspension as the flexure motors. This enables the piezoelectric motor 120 and the pseudo feature 118 configured as a damper configured for mounting on the baseplate 110 and the flexure motors to be mounted at the same stage during the manufacturing process of the suspension 100, which can be at any point during the assembly of the disk-drive suspension 100. This can minimize damage to the motors and increase manufacturing yields of the suspensions.

A piezoelectric motor 120 mounted to the baseplate 110 is configured to move the load beam 100. For various embodiments, piezoelectric motor 120 is implemented using techniques including those described herein. Pseudo feature 118 configured as a damper, according to some embodiments, is configured to balance out the mass distribution, to add a desired stiffness to the suspension 100, and to dampen vibrations that occur on the suspension 100. The pseudo feature 118 configured as a damper may be manufactured separately and then affixed to baseplate 110. For some embodiments, pseudo feature 118 is affixed to the baseplate 110 using techniques including, but not limited to, welding, adhesive, and other mounting techniques such as those known in the art. According to some embodiments, the pseudo feature 118 is formed integrally with the baseplate 110.

According to some embodiments, piezoelectric motor 120 is mounted on mounting pad 130 and 132 with nonconductive adhesive. A first electrode on the piezoelectric motor is coupled with at least one of the traces of the conductive layer on suspension 100 using techniques including those known in the art. The trace is configured to provide signals, such as control signals, for the piezoelectric motor 120 using techniques including those known in the art. For example, the control signal is power. A second electrode of the piezoelectric motor 120 is electrically coupled with the baseplate 110 to provide a ground. For example, a ground dot 134 may be used to electrically couple the second electrode to the baseplate 110 using techniques including those known in the art.

Figure 4:
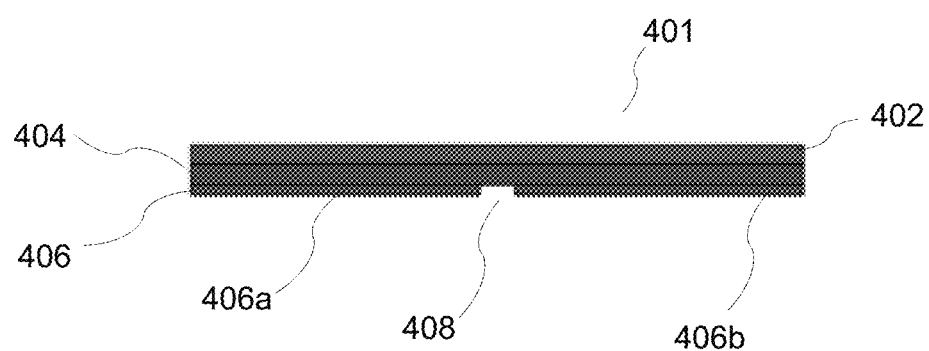
FIG. 4 illustrates a side view of a pseudo feature configured as a damper according to an embodiment.

FIG. 4 illustrates a side view of a pseudo feature configured as a damper according to an embodiment. The pseudo feature 401 is configured as a damper. The pseudo feature 401, according to various embodiments, includes a first constraining layer 402 as a first layer, a damper layer 404 as a middle layer, and a second constraining layer 406 as a third layer. According to the embodiment illustrated in FIG. 4, the damper layer 404 is arranged between the first constraining layer 402 and the second constraining layer 406. For some embodiments, the first constraining layer 402, the damper layer 404, and the second constraining layer 406 are configured to define a hole in each respective layer. For some embodiments, the hole of each layer is aligned in the center of the pseudo feature 401. According to various embodiments, the second constraining layer 406 is formed of a first part 406a and a second part 406b with a void 408 between the first part 406a and the second part 406b. The void 408 enables relative movement between the first part 406a and the second part 406b when opposite forces are acting on the second constraining layer 406. For example, such relative movement can occur during sway vibration of the suspension or during actuation of a piezoelectric motor on the suspension. For some embodiments, any one of the first constraining layer 402, the damper layer 404, and the second constraining layer 406 are made up of multiple layers.

Pseudo feature 401, according to some embodiments, is manufactured separately and then affixed to a baseplate using techniques known in the art including, but not limited to, laser welding, solder, and adhesive. According to other embodiments, pseudo feature 401 is partly or wholly manufactured integrally with a baseplate.

Figure 5:
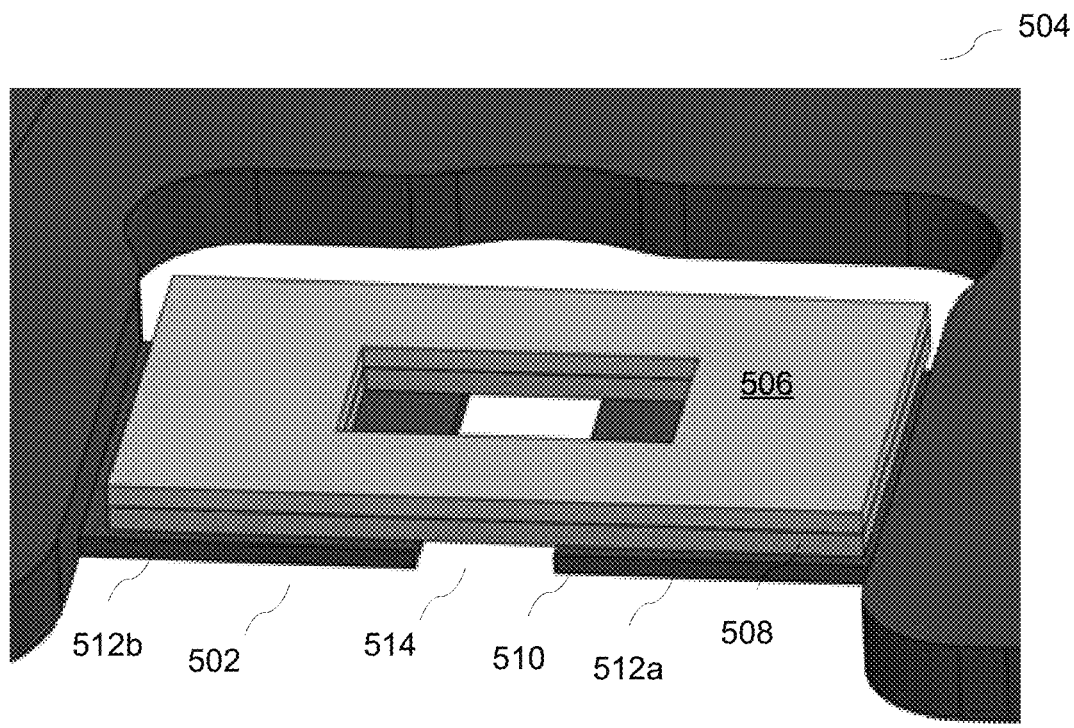
FIG. 5 illustrates a pseudo feature configured as a damper that is partly manufactured integrally with a baseplate according to an embodiment.

FIG. 5 illustrates a pseudo feature configured as a damper that is partly manufactured integrally with a baseplate according to an embodiment. The pseudo feature 502 configured as a damper includes a first constraining layer 506, a damper layer 508, and a second constraining layer 510. The second constraining layer 510 includes a first part 512a and a second part 512b forming a void 514 between the first part 512a and the second part 512b. The first part 512a and the second part 512b are formed integrally with the baseplate 504 of the suspension.

According to various embodiments, baseplate 504 is made from stainless steel ("SST"). Similarly, the second constraining layer 510 of pseudo feature 502 is unitarily formed with baseplate 504 from stainless steel. Forming, etching or laser ablation could create areas of greater and lesser thickness and width of the baseplate 504 to form the second constraining layer 510. Furthermore, laser treatment could locally alter the mechanical properties of the stainless steel within the second constraining layer 510 of the pseudo feature 502, such as creating locally softer areas, to help fine tune the properties of the pseudo feature 502. The damper layer 508 and first constraining layer are formed according to techniques including those described herein.

Figure 6:
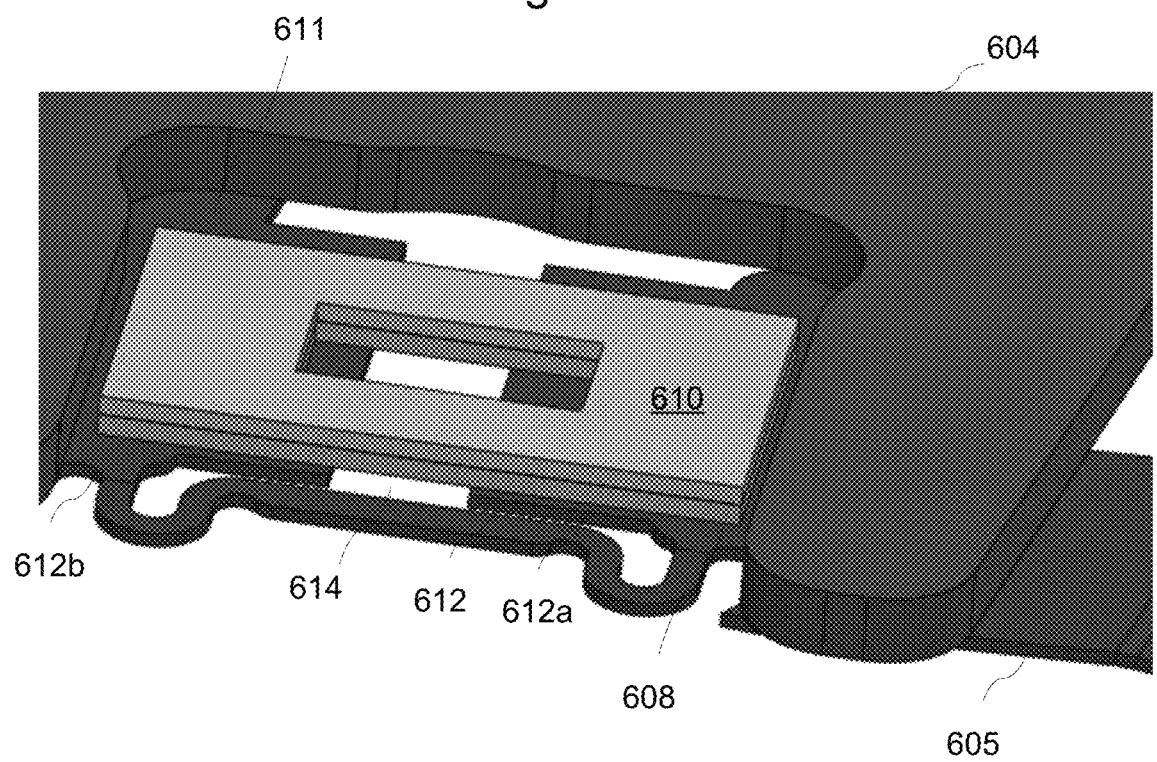
FIG. 6 illustrates a suspension including a baseplate and a loadbeam including a pseudo feature configured as a damper according to an embodiment.

FIG. 6 illustrates a suspension including a baseplate and a loadbeam including a pseudo feature configured as a damper according to an embodiment. The baseplate 604 of suspension 602 and loadbeam 605 are formed of stainless steel, according to some embodiments, using techniques including those described herein. The baseplate 604 and the loadbeam 605 are physically coupled to each other using techniques known in the art including, but not limited to welding and adhesive. The pseudo feature 611 configured as a damper includes a first constraining layer 610, a damper layer 608, and a second constraining layer 612 formed using techniques including those described herein. The second constraining layer 612 includes a first part 612a and a second part 612b forming a void 614 between the first part 612a and the second part 612b. The first part 612a and the second part 612b are formed integrally with the loadbeam 605 of the suspension. Embodiments not integrally formed with a loadbeam 605 may include a first mounting pad and a second mounting pad each configured to receive a respective end of a pseudo feature and affixing the respective ends to the mounting pads using techniques including those described herein.

Figure 7:
FIG. 7 illustrates a side view of a pseudo feature configured as a damper according to an embodiment.

FIG. 7 illustrates a side view of a pseudo feature configured as a damper according to an embodiment. The pseudo feature 701 is configured as a damper for use in a suspension for a hard disk drive using techniques including those described herein. The pseudo feature 701, according to various embodiments, includes a first constraining layer 702 as a first layer, a damper layer 704 as a middle layer, and a second constraining layer 706 as a third layer. According to the embodiment illustrated in FIG. 7, the damper layer 704 is arranged between the first constraining layer 702 and the second constraining layer 706. For some embodiments, the first constraining layer 702, the damper layer 704, and the second constraining layer 706 are configured to define a hole in each respective layer. For embodiments, the hole of each layer is aligned in the center of the pseudo feature 701. Other embodiments include a pseudo feature configured as a damper with a second constraining layer integrally formed of a loadbeam or a baseplate according to techniques including those described herein.

In the foregoing specification, specific exemplary embodiments of the invention have been described. It will, however, be evident that various modifications and changes may be made thereto. The specification and drawings are, accordingly, to be regarded in an illustrative rather than a restrictive sense.

I claim:

1. A pseudo feature for a suspension, the pseudo feature comprising:
a first constraining layer;
a second constraining layer comprising a void and configured to be mounted within a baseplate of the suspension; and
a damper layer arranged between the first constraining layer and the second constraining layer,
the first constraining layer, the second constraining layer, and the damper layer are configured to be positioned within a first opening in the baseplate on a first side of a longitudinal axis of the suspension, the first constraining layer, the damper layer, and at least a portion of the void of the second constraining layer define a hole.

2. The pseudo feature of claim 1, wherein the hole is in a center of each of the first constraining layer, the damper layer and the second constraining layer.

3. The pseudo feature of claim 1, wherein a size of the hole is configured based on a stiffness and a mass requirement for the suspension.

4. The pseudo feature of claim 1, wherein the second constraining layer includes a first part and a second part.

5. The pseudo feature of claim 4, wherein the first part and the second part are arranged to form the void between the first part and the second part.

6. The pseudo feature of claim 4, wherein the first part and the second part are formed as part of the suspension.

7. The pseudo feature of claim 6, wherein the first part and the second part are formed as part of the baseplate of the suspension.

8. The pseudo feature of claim 6, wherein said first part and said second part are formed as part of a loadbeam of the suspension.

9. The pseudo feature of claim 1, wherein the first constraining layer, the second constraining layer, and the damper layer is configured to balance a mass distribution of a piezoelectric motor located on a second side of the longitudinal axis.

10. A method for manufacturing a pseudo feature for a suspension, the method comprising:
forming a first constraining layer;
forming a second constraining layer comprising a void; and
forming a damper layer such that the damper layer is between the first constraining layer and the second constraining layer,
the first constraining layer, at least a portion of the void of the second constraining layer, and the damping layer are formed to define a hole and to be positioned within a first opening in the baseplate on a first side of a longitudinal axis of the suspension.

11. A suspension comprising:
a load beam assembly; and
a base plate assembly including a first opening in the baseplate on a first side of a longitudinal axis, and a pseudo feature within the first opening in the baseplate, the pseudo feature including:
a first constraining layer;
a second constraining layer comprising a void and configured to be mounted within a baseplate of the suspension; and
a damper layer arranged between the first constraining layer and the second constraining layer,
the first constraining layer, at least a portion of the void of the second constraining layer, and the damper layer are configured to define a hole and configured to be positioned within the first opening in the baseplate on the first side of the longitudinal axis of the suspension, to balance a mass distribution of a piezoelectric motor located on a second side of the longitudinal.

12. The suspension of claim 11, wherein the hole is in a center of each of the first constraining layer, the damper layer and the second constraining layer.

13. The suspension of claim 11, wherein a size of the hole is configured based on a stiffness and a mass requirement for the suspension.

14. The suspension of claim 11, wherein the second constraining layer includes a first part and a second part.

15. The suspension of claim 14, wherein the first part and the second part are arranged to form a void between the first part and the second part.

16. The suspension of claim 14, wherein the first part and the second part are formed as part of the baseplate of the suspension.

17. The suspension of claim 11, further comprising a second opening on the second side of the longitudinal axis, the second opening is configured to receive the piezoelectric motor.

18. The suspension of claim 11, wherein the first constraining layer, the second constraining layer, and the damper layer is configured to balance a mass distribution of a piezoelectric motor located on a second side of the longitudinal axis.

* * * * *